US012702872B2

(12) United States Patent
Liu et al.

(10) Patent No.: US 12,702,872 B2
(45) **Date of Patent: *Aug. 11, 2026**

(54) ANNULAR UNIT FOR MOISTURE MANAGEMENT IN RESPIRATORY MASK

(71) Applicant: HONEYWELL SAFETY PRODUCTS USA, INC., Charlotte, NC (US)

(72) Inventors: Anna Liu, Shanghai (CN); Linan Zhao, Shanghai (CN); Kevin Lu, Shanghai (CN)

(73) Assignee: Honeywell Safety Products USA, Inc., Latham, NY (US)

( * ) Notice: Subject to any disclaimer, the term of this patent is extended or adjusted under 35 U.S.C. 154(b) by 1001 days.

This patent is subject to a terminal disclaimer.

(21) Appl. No.: 17/095,576

(22) Filed: Nov. 11, 2020

(65) Prior Publication Data

US 2021/0060364 A1 Mar. 4, 2021

Related U.S. Application Data

(63) Continuation of application No. 15/780,740, filed as application No. PCT/CN2015/000845 on Dec. 3, 2015, now Pat. No. 10,864,391.

(51) Int. Cl.

*A62B 18/08* (2006.01)
*A41D 13/11* (2006.01)
(Continued)

(52) U.S. Cl.

CPC .......... *A62B 18/08* (2013.01); *A41D 13/1161* (2013.01); *A41D 13/1176* (2013.01);
(Continued)

(58) Field of Classification Search

CPC . A41D 13/11; A41D 13/1107; A41D 13/1115; A41D 13/1123; A41D 13/113;
(Continued)

(56) References Cited

U.S. PATENT DOCUMENTS 4,488,547 A 12/1984 Mason
4,600,002 A 7/1986 Maryyanek et al.
(Continued)

FOREIGN PATENT DOCUMENTS

CN 2819849 Y 9/2006
CN 103706055 A 4/2014
(Continued)

OTHER PUBLICATIONS

European Communication pursuant to Rules 161(2) and 162 EPC for Application No. 15909438.2, dated Aug. 29, 2018, 1 page.
(Continued)

*Primary Examiner* — Alireza Nia
*Assistant Examiner* — Gina Mccarthy
(74) *Attorney, Agent, or Firm* — Fredrikson & Byron, P.A.

(57) ABSTRACT

Examples of the present disclosure relate generally to absorbing elements in respiratory face masks. In some examples, a structure for respiratory masks that can both absorb moisture from the face (such as perspiration, as well as from condensed moisture in the breath), and maintain a low breath resistance (won't increase the breath resistance significantly) is disclosed herein. The structure includes an annular structure added to the respiratory masks for moisture management. In some examples, the annular structure is made up of moisture absorbent materials. This structure may also be known as an absorbing element operable to absorb moisture effectively, provide a respiratory mask with improved moisture control characteristics, reduce fogging of a face shield or eyeglasses of the wearer, and reduce the amount of uncomfortable moisture buildup on the face of the wearer.

15 Claims, 2 Drawing Sheets

(51) Int. Cl.
*A41D 31/12* (2019.01)
*A62B 23/02* (2006.01)

(52) U.S. Cl.
CPC ........... *A41D 31/12* (2019.02); *A41D 31/125* (2019.02); *A62B 23/025* (2013.01); *A41D 13/1138* (2013.01)

(58) Field of Classification Search
CPC ........... A41D 13/1138; A41D 13/1161; A41D 13/1176; A41D 31/12; A41D 31/125; A61M 16/06; A61M 16/0605; A61M 16/0616; A61M 16/0622; A61M 16/0627; A62B 18/08; A61F 9/02; A61F 9/026; A61F 9/027; A61F 9/028; A61F 9/029; A61F 9/04; A61F 9/045
See application file for complete search history.

(56) References Cited

U.S. PATENT DOCUMENTS

| | | | | |
|---|---|---|---|---|
| 4,628,927 | A | 12/1986 | Ward | |
| 4,941,467 | A | 7/1990 | Takata | |
| 5,603,317 | A | 2/1997 | Farmer | |
| 5,706,804 | A | 1/1998 | Baumann et al. | |
| 5,813,398 | A | 9/1998 | Baird et al. | |
| 6,062,220 | A | 5/2000 | Whitaker et al. | |
| 6,308,330 | B1 | 10/2001 | Hollander et al. | |
| 6,526,975 | B1 | 3/2003 | Chung | |
| 6,644,314 | B1 | 11/2003 | Elsberg | |
| 7,017,577 | B2 | 3/2006 | Matich | |
| 7,390,760 | B1 * | 6/2008 | Chen | D04H 1/43838 442/403 |
| 8,622,059 | B2 | 1/2014 | Kleman | |
| 8,808,594 | B1 * | 8/2014 | Marshall | D01F 11/00 264/172.19 |
| 9,661,884 | B2 | 5/2017 | Yarahmadi | |
| 9,770,611 | B2 | 9/2017 | Facer et al. | |
| 10,864,391 | B2 * | 12/2020 | Liu | A62B 23/025 |
| 2002/0046754 | A1 | 4/2002 | Baumann et al. | |
| 2004/0192136 | A1 * | 9/2004 | Gusky | D21F 9/00 442/264 |
| 2006/0150294 | A1 * | 7/2006 | Yanamadala | A41D 27/13 2/53 |
| 2006/0230485 | A1 | 10/2006 | Lee | |
| 2007/0044801 | A1 | 3/2007 | Mathis et al. | |
| 2008/0184996 | A1 | 8/2008 | Colorado | |
| 2008/0271740 | A1 * | 11/2008 | Gloag | A62B 23/025 128/206.28 |
| 2009/0014006 | A1 | 1/2009 | Levin | |
| 2009/0084384 | A1 | 4/2009 | Cheng et al. | |
| 2010/0218774 | A1 | 9/2010 | Flaherty | |
| 2012/0180795 | A1 | 7/2012 | Knight | |
| 2013/0067626 | A1 | 3/2013 | Sandor | |
| 2013/0139829 | A1 | 6/2013 | Rutan | |
| 2014/0076334 | A1 | 3/2014 | Cheng et al. | |
| 2014/0123981 | A1 | 5/2014 | Willard et al. | |
| 2014/0190492 | A1 * | 7/2014 | Noh | A41D 13/1138 128/863 |
| 2014/0237695 | A1 | 8/2014 | Al Malki | |
| 2015/0059773 | A1 | 3/2015 | Duffy | |
| 2015/0065976 | A1 * | 3/2015 | Roe | A61F 13/42 604/374 |
| 2015/0190543 | A1 * | 7/2015 | Marshall | A61L 15/24 424/443 |
| 2015/0216241 | A1 | 8/2015 | Lee et al. | |
| 2016/0015098 | A1 * | 1/2016 | Conlon | A41D 13/1115 29/428 |
| 2016/0213959 | A1 | 7/2016 | Barklow | |
| 2016/0317771 | A1 | 11/2016 | Klee et al. | |

FOREIGN PATENT DOCUMENTS

| | | | |
|---|---|---|---|
| CN | 203618834 | U | 6/2014 |
| DE | 202014006156 | U1 | 9/2014 |
| WO | 02/38221 | A1 | 5/2002 |
| WO | 2013/165984 | A1 | 11/2013 |
| WO | 2014/152897 | A1 | 9/2014 |
| WO | 2015/091304 | A1 | 6/2015 |
| WO | 2017/091920 | A1 | 6/2017 |

OTHER PUBLICATIONS

European Communication pursuant to Rules 70(2) and 70a(2) EPC for Application No. 15909438.2, dated Aug. 9, 2019, 3 pages.
European Search Report and Search Opinion Received for EP Application No. 15909438.2, mailed on Jul. 23, 2019, 8 pages.
International Preliminary Report on Patentability received for PCT Patent Application No. PCT/CN2015/000845, mailed on Jun. 14, 2018, 6 pages.
International Search Report and Written Opinion received for PCT Patent Application No. PCT/CN2015/000845, mailed on Aug. 23, 2016, 8 pages.
Non-Final Rejection Mailed on Aug. 3, 2020 for U.S. Appl. No. 15/780,740.
Notice of Allowance and Fees Due (PTOL-85) Mailed on Oct 26, 2020 for U.S. Appl. No. 15/780,740
Communication pursuant to Article 94(3) EPC from the Examining Division Mailed on Nov. 9, 2021 for EP Application No. 15909438, 5 pages.
EP Office Action Mailed on May 11, 2023 for EP Application No. 15909438, 6 page(s).
U.S. Appl. No. 15/780,740, filed Jun. 1, 2018, U.S. Pat. No. 10,864,391, Patented.

* cited by examiner

ANNULAR UNIT FOR MOISTURE MANAGEMENT IN RESPIRATORY MASK

CROSS-REFERENCE TO RELATED APPLICATIONS

The present application is a continuation of U.S. Non-Provisional patent application Ser. No. 15/780,740, filed Jun. 1, 2018, entitled "Annular Unit for Moisture Management in Respiratory Mask," which is the National Stage of International Application No. PCT/CN2015/000845, filed on Dec. 3, 2015 and entitled "Annular Unit for Moisture Management in Respiratory Mask," the entire disclosures of each of which are incorporated herein by reference in their entireties for all purposes as if reproduced in their entireties.

BACKGROUND

The use of respiratory masks is a recommended practice in certain work environments to help prevent the inhalation of small particles, dust, or chemicals and to prevent the spread of disease. Also, respiratory masks may be worn to protect people by filtering airborne contaminants and micro-organisms in the ambient air, especially in areas with heavy smog. Respiratory masks may comprise a plurality of filtering options, depending on the application of the masks. Some respiratory masks may comprise half-masks, operable to cover the nose and mouth of a user.

SUMMARY

Aspects of the disclosure may include embodiments of a face mask comprising a body shaped to fit over at least a portion of a user's face, wherein the body comprises a filtering material; and an absorbing element attached to an inner surface of the body, wherein the absorbing element comprises a facing layer operable to contact the face of the user, wherein the facing layer allows moisture to penetrate into the absorbing element; at least one absorbing sheet layer operable to disperse moisture within the absorbing element; an absorbent core operable to absorb the moisture; and a backing layer operable to contain the moisture within the absorbing element, wherein the absorbing element is located around the perimeter of the face mask, wherein the absorbing element is operable to seal the face mask against the user's face, wherein the absorbing element is operable to absorb moisture, wherein the absorbing element is removably attached to the inner surface of the body, and may be removed and replaced by a second absorbing element, and wherein the absorbing element comprises an annular shape.

In some embodiments, the absorbing element is operable to absorb at least approximately 20 grams of moisture.

Additional aspects of the disclosure may include embodiments of a face mask comprising a body shaped to fit over at least a portion of a user's face, wherein the body comprises a filtering material; and an absorbing element attached to an inner surface of the body, wherein the absorbing element is operable to seal the face mask against the user's face, wherein the absorbing element is operable to absorb moisture, wherein the absorbing element comprises at least one absorbing sheet layer operable to disperse moisture within the absorbing element, and an absorbent core operable to absorb the moisture, wherein the absorbing element is removably attached to the inner surface of the body, and may be removed and replaced by a second absorbing element.

In some embodiments, the absorbent core layer comprises one or a combination of the following: super absorbent fibers (SAF), super absorbent polymers (SAP), wood pulp, and nonwoven materials. In some embodiments, the absorbing element comprises an annular shape. In some embodiments, the absorbing element is located around the perimeter of the face mask In some embodiments, the absorbing material further comprises a facing layer operable to contact the face of the user, wherein the facing layer allows moisture to penetrate into the absorbing element; and a backing layer operable to contain the moisture within the absorbing element. In some embodiments, the absorbing element is operable to absorb at least approximately 20 milliliters (mL) of moisture. In some embodiments, the absorbing element is operable to absorb at least approximately 10 mL of moisture.

Other aspects of the disclosure may include embodiments of a face mask comprising a body shaped to fit over at least a portion of a user's face, wherein the body comprises a filtering material; and an absorbing element attached to an inner surface the body, wherein the absorbing element is operable to absorb moisture and is located around the perimeter of the face mask, and wherein the absorbing element comprises a facing layer operable to contact the face of the user, wherein the facing layer allows moisture to penetrate into the absorbing element; at least one absorbing sheet layer operable to disperse moisture within the absorbing element; an absorbent core operable to absorb the moisture; and a backing layer operable to contain the moisture within the absorbing element.

In some embodiments, the absorbing element comprises an annular shape. In some embodiments, the absorbing element is operable to seal the face mask against the user's face. In some embodiments, the absorbing element is removably attached to the inner surface of the body, and may be removed and replaced by a second absorbing element. In some embodiments, the facing layer comprises a moisture penetrable material, hydrophobic material, allow moisture to penetrate into the absorbing element. In some embodiments, the absorbing sheet layer comprises a combination of polyester and pulp material. In some embodiments, the absorbent core layer comprises one or a combination of the following: SAF, SAP, wood pulp, and nonwoven materials. In some embodiments, the backing layer comprises a nonwoven material operable to protect and package the other layers of the absorbing element. In some embodiments, the absorbing element may comprise a width of between approximately 0.2 centimeters (cm) and 2 cm. In some embodiments, the absorbing element is operable to absorb at least approximately 20 grams of moisture. In some embodiments, the absorbing element is operable to absorb at least approximately 10 grams of moisture.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
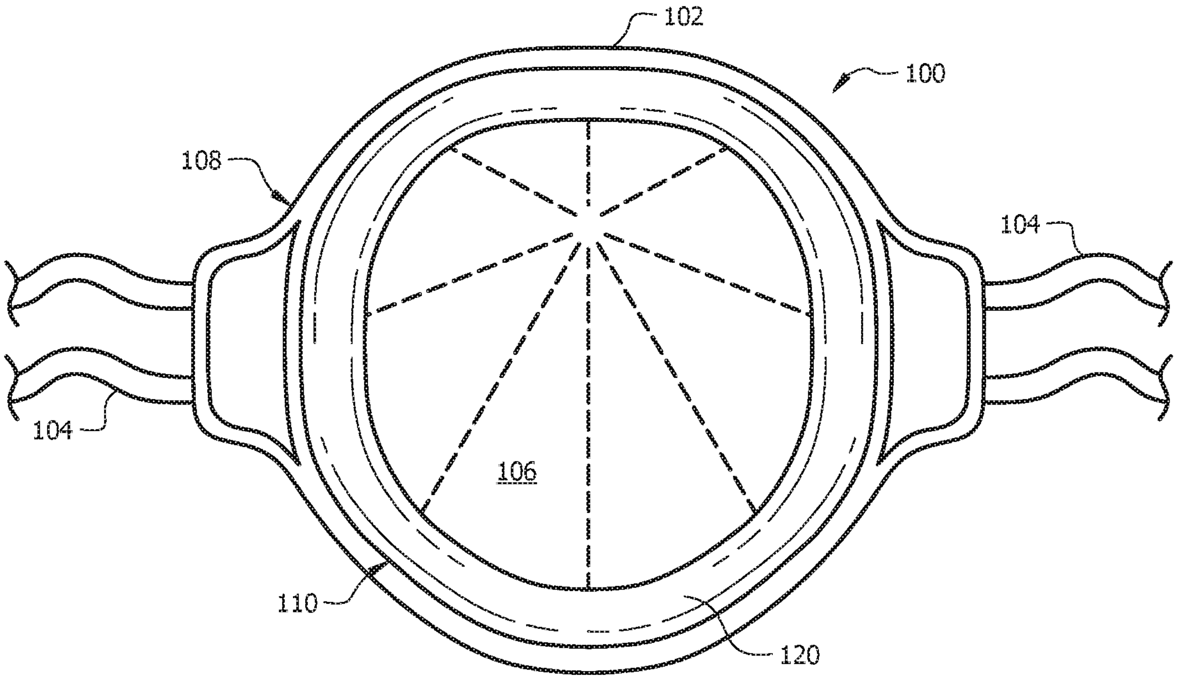
FIG. 1 illustrates a face mask comprising an absorbing element according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include absorbing elements for use with respiratory face masks. The use of respiratory masks is a recommended practice in certain work environments to help prevent the inhalation of small particles, dust, or chemicals and to prevent the spread of disease.

Also, respiratory mask may be worn to protect people by filtering airborne contaminants and microorganisms in the ambient air, especially in areas with heavy smog. However, wearing a respiratory mask that covers the nose and mouth may cause inconvenience or discomfort for the user.

One problem associated with wearing a respiratory mask is moisture buildup within the mask. The main sources of moisture in a face mask are perspiration and the wearer's exhaled breath (or respiration). Such moisture can result in the fogging of eyeglasses when worn, and also may create uncomfortable feelings on the face of the wearer.

Typical solutions to mitigate the moisture problem involve adding absorbent materials into the material of the face mask, but the introduction of absorbent materials can cause other deficiencies. For example, absorbent materials may cause an increase of breathing in the face mask.

Applicants have developed a structure for respiratory masks that can both absorb moisture from the face (such as perspiration, as well as from condensed moisture in the breath), and maintain a low breath resistance (won't increase the breath resistance significantly).

Commonly, respiratory masks are hemispheroidal (rounded or dome-like), and the area contacting the face of wearer is an annular circle. So, when the moisture condenses, the fluid (including perspiration) will collect around the skin where the face connecting with the respiratory mask and may result uncomfortable feeling for wearers. Applicants have developed an annular structure added to the respiratory masks for moisture management, wherein the annular structure comprises moisture absorbent materials. This structure may also be known as an absorbing element operable to absorb moisture effectively, provide a respiratory mask with improved moisture control characteristics, reduce fogging of a face shield or eyeglasses of the wearer, and reduce the amount of uncomfortable moisture buildup on the face of the wearer.

Referring now to FIG. 1, a face mask 100 is shown, wherein the face mask 100 may comprise a body 102 comprising a filtering material operable to filter hazardous materials in the air a user is breathing. The body 102 may be shaped to fit over a portion of the user's face, such as the user's mouth and nose. In some embodiments, the mask 100 may comprise one or more straps 104 operable to hold the mask 100 in place on the user's face. In some embodiments, the mask 100 may comprise an inner surface 106 and an outer surface 108. The inner surface 106 of the mask 100 may be proximate the user's face.

In some embodiments, the face mask 100 may comprise a rounded or dome-like shape, operable to fit over the user's nose and mouth. In some embodiments, the filtering material of the face mask 100 may comprise woven and/or nonwoven filtering material. The face mask 100 may comprise a dust mask. The face mask 100 may comprise a chemical mask.

In some embodiments, the mask 100 may comprise an absorbing element 120 attached to the mask 100. In some embodiments, the absorbing element 120 may be attached to the inner surface 106 of the mask 100. In some embodiments, the mask 100 may comprise an attachment element 110, wherein the absorbing element 120 may attach to the mask 100 via the attachment element 110. The absorbing element 120 may be operable to absorb moisture that is generated by a user's respiration and/or perspiration. The absorbing element 120 may be operable to contact a user's face, facilitating the absorption of perspiration from a user's face.

In some embodiments, the absorbing element 120 may comprise a width of between approximately 0.2 centimeters (cm) and 2 cm. In some embodiments, the absorbing element 120 may be annularly shaped, to better fit against a user's face. The absorbing element 120 may be located only around the perimeter of the face mask 100. In some embodiments, the perimeter of the face mask 100 may be the part of the face mask 100 that contacts the face of the user. Therefore, having the absorbing element 120 at the perimeter of the face mask 100 may allow for the absorbing element 120 to contact the user's face.

Additionally, the absorbing element 120 may be located about the perimeter of the face mask 100 to reduce the impact of the absorbing element 120 on the breathing resistance in the face mask 100. When the absorbing element 120 is becoming saturated with water, the remainder of the inner surface 106 of the face mask 100 may be open and having reduced moisture, due to the absorption of the absorbing element 120. Therefore, the breathing resistance within the face mask 100 should not be significantly impacted by the presence of the absorbing element 120. Additionally, the filtering efficiency of the face mask 100 may not be significantly impacted by the presence of the absorbing element 120. For example, the results of filtering efficiency and breathing resistance testing, compared with a typical face mask without an absorbing element 120, are shown below in Table 1.

TABLE 1

| Sample | Penetration % | Inhalation Resistance ($mmH_2O$) | Exhalation Resistance ($mmH_2O$) |
|---|---|---|---|
| Without absorbing element | 1.43 | 9.8 | 9.5 |
| With absorbing element | 1.87 | 9.3 | 9.1 |

In some embodiments, the absorbing element 120 may be removably attached to the inner surface 106 of the face mask 100 via the attachment element 110 of the face mask 100. In some embodiments, the attachment element 110 may comprise double-adhesive tape, press buttons, slide fastener(s), Velcro, or another removable attachment. When the absorbing element is saturated, or if the absorbing element is damaged in some way, the absorbing element 120 may be removed from the face mask 100 and may be possibly replaced by a second absorbing element. In some embodiments, the attachment element 110 may comprise an element on the face mask 100. In some embodiments, the attachment may comprise one portion attached to the face mask 100 and another portion attached to the absorbing element 120.

In some embodiments, the absorbing element 120 may provide an effective seal with the user's face. For example, in a fit test comparison with a typical face mask that does not comprise an absorbing element 120, the face mask 100 with the absorbing element 120 may provide a better seal with higher fit test results, as shown in Table 2 below. In the fit testing, a passing fit result requires a fit factor of at least 100, and the highest fit factor result is 200. The fit testing may comprise testing the fit of the face mask 100 during different activities by a user, as shown in Table 2. Additionally, as the absorbing element 120 absorbs moisture, the seal with the user's face may remain, even if the thickness of the absorbing element 120 increases.

TABLE 2

| Sample | Overall Fit Factor | Normal Breathing | Deep Breathing | Head side to side | Head up and down | Talking | Bending over | Normal breathing |
|---|---|---|---|---|---|---|---|---|
| Without absorbing element | 114 | 130 | 130 | 105 | 122 | 137 | 68 | 155 |
| With absorbing element | 177 | 200 | 200 | 200 | 200 | 200 | 103 | 200 |

In some embodiments, the absorption of the absorbing element 120 was tested, compared with a face mask that does not comprise an absorbing element. The results are shown in Table 3 below, wherein Wo is the initial weight of the masks in grams, and W1 is the weight of the masks in grams after the mask has been exposed to moisture for approximately 10 minutes. The moisture may be generated by heating water to approximately 70 C while stirring the water. The difference in the weights OW illustrates the amount of moisture, in grams, absorbed by each of the masks during the 10 minute period. As shown in Table 3, the mask with an absorbing element is capable of absorbing approximately 0.24 grams more of moisture, and this is just in a 10 minute period. Additionally, at the end of this testing, the filtering material of the mask without the absorbing element was wet to the touch, while the mask with the absorbing element was dry to the touch.

TABLE 3

| Sample | $W_0$ (g) | $W_1$ (g) | ΔW (g) |
|---|---|---|---|
| Without absorbing element | 6.9503 | 7.1432 | 0.1929 |
| With absorbing element | 11.5051 | 11.9382 | 0.4331 |

In some embodiments, the absorbing element 120 may be operable to absorb at least approximately 10 mL of moisture. In some embodiments, the absorbing element 120 may be operable to absorb at least approximately 20 mL of moisture. In some embodiments, the absorbing element 120 may be operable to absorb approximately 30 mL of moisture. In some embodiments, the absorbing element 120 may be operable to absorb at least approximately 10 g of moisture. In some embodiments, the absorbing element 120 may be operable to absorb at least approximately 20 g of moisture.

Figure 2:
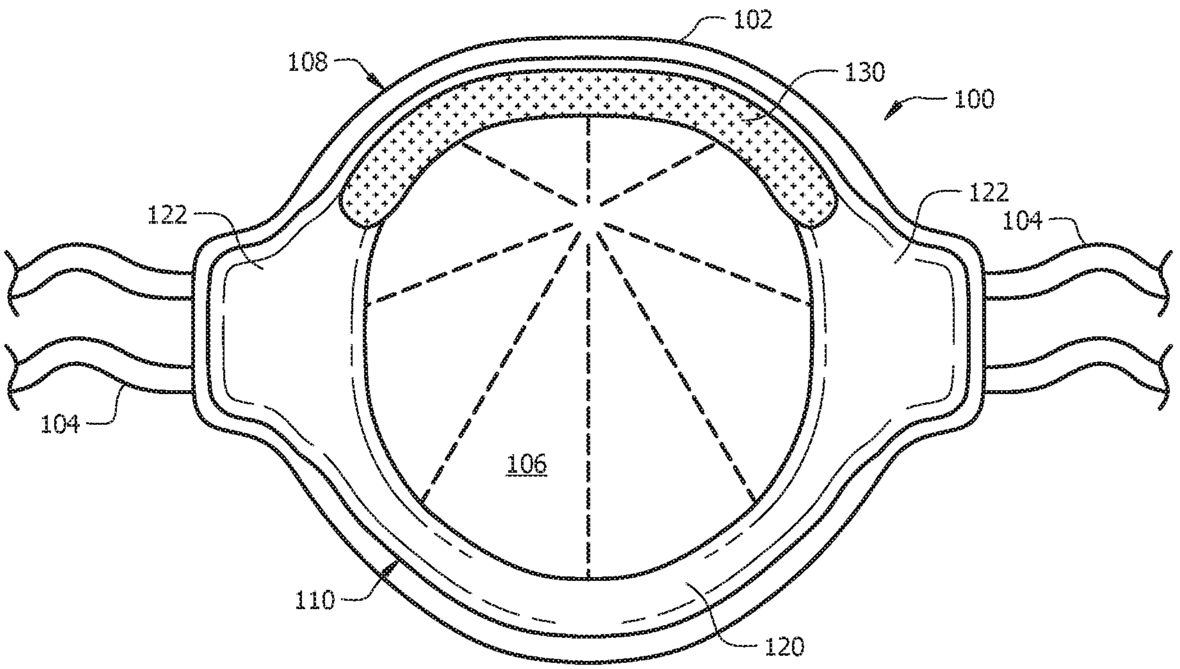
FIG. 2 illustrates a face mask comprising an absorbing element according to an embodiment of the disclosure.

FIG. 2 illustrates an alternative embodiment of a face mask 100, wherein the absorbing element 120 comprises additional flaps 122 that extend further at the sides of the face mask 100. The flaps 122 may create additional surface area for contacting the user's face. The flaps 122 may also ensure a better seal with the user's face at the sides of the user's face. Additionally, the face mask 100 may comprise a nose piece 130 attached to the face mask 100, possibly between the user's face and the adsorbing element 120. The nose piece 130 may provide an improved seal around the user's nose, and may possibly allow for moisture to pass through the nose piece 130 to the absorbing element 120. In an alternative embodiment, the nose piece 130 may be located between the face mask 100 and the absorbing element 120, such that the absorbing element 120 contacts the user's face.

Figure 3:
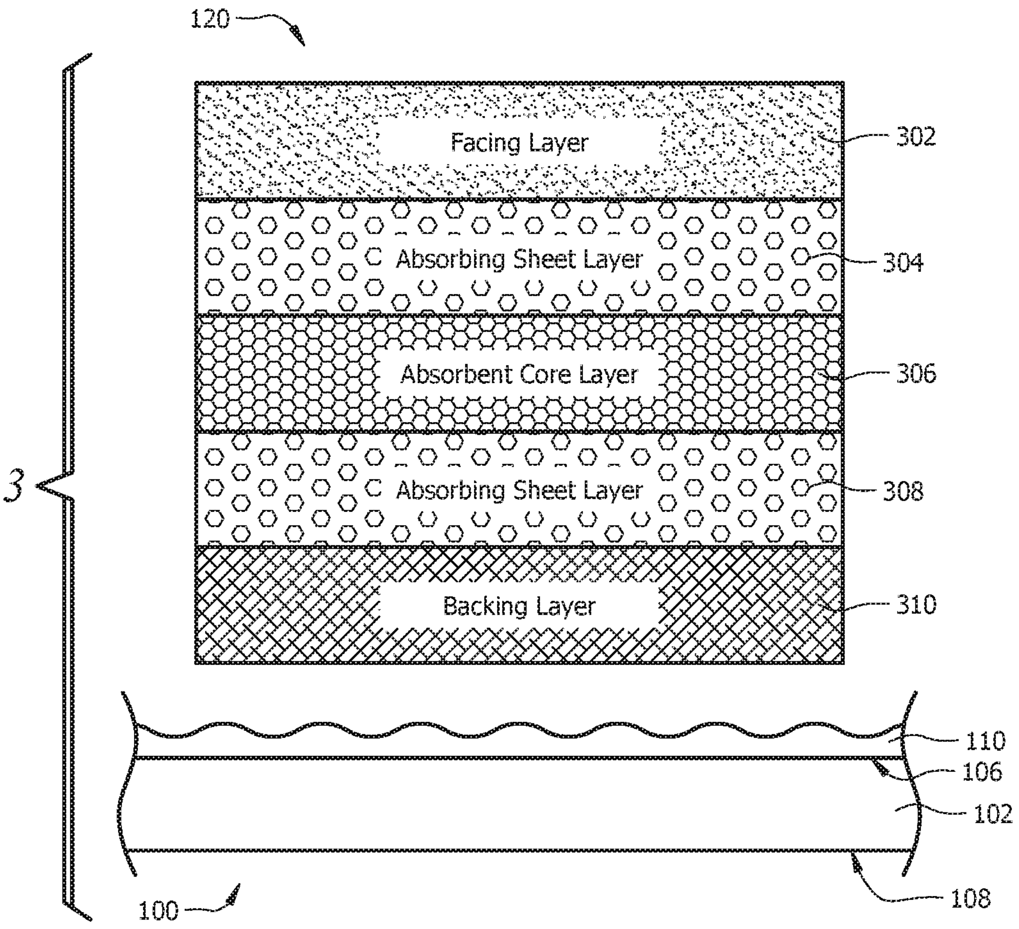
FIG. 3 illustrates a detailed view of a face mask comprising an absorbing element according to an embodiment of the disclosure.

FIG. 3 illustrates a detailed view of the absorbing element 120 and body 102 of the face mask 100. In some embodiments, the absorbing element 120 may comprise a plurality of layers. Each of the layers may serve a purpose in the absorption of moisture within the face mask. The annular absorbent element 120 could be preassembled or prepackaged by ultrasonic bonding or thermal bonding or other method. Then, the absorbing element 120 may be stitched onto the face mask 100 by ultrasonic bonding or thermal bonding or another method, or the absorbing element 120 may be removably attached to the face mask 100 (as described above). Alternatively, the multi-layered absorbing element 120 could be simultaneously assembled to the respiratory masks during the assembling of the face mask 100.

In some embodiments, the absorbing element 120 may comprise a facing layer 302 operable to contact the face of the user, wherein the facing layer allows moisture to penetrate into the absorbing element. In some embodiments, the facing material may comprise a hydrophobic material, wherein the facing layer 302 may remain dry and allow moisture to pass through the facing material 302 to the rest of the layers. In some embodiments, the facing layer 302 may comprise a polypropylene (PP) nonwoven material. In some embodiments, the facing layer 302 may comprise perforations. In other embodiments, the material of the facing layer 302 may not comprise perforations.

In some embodiments, the absorbing element 120 may comprise at least one absorbing sheet layer 304 operable to disperse moisture within the absorbing element. The absorbing sheet layer 304 may comprise a material with strong absorbing and dispersion qualities, operable to quickly absorb the moisture that has penetrated through the facing layer, and disperse the moisture to the whole absorbing sheet layer 304 as well as the other layers of the absorbing element 120. In some embodiments, the absorbing sheet layer 304 may be super-hydrophilic. In some embodiments, the absorbing sheet layer 304 may comprise a combination of polyester and pulp material. In some embodiments, the absorbing sheet layer 304 may comprise a 45% polyester and 55% pulp material.

In some embodiments, the absorbing element 120 may comprise an absorbent core layer 306 operable to absorb and retain a significant amount of the moisture. In some embodiments, the absorbent core 306 may comprise one or a combination of the following: SAF, SAP, wood pulp, and nonwoven materials. In some embodiments, the absorbent core 306 may comprise a blend of the above materials. In some embodiments, the absorbent core 306 may comprise another absorbing material.

In some embodiments, the absorbing element 120 may comprise a second absorbing sheet layer 308. The second absorbing sheet layer 308 may be similar to the first absorbing sheet layer 304. The second absorbing sheet layer 308 may provide additional absorption and dispersion qualities.

In some embodiments, the absorbing element 120 may comprise a backing layer 310 operable to contain the moisture within the absorbing element. In some embodiments, the backing layer 310 may comprise a nonwoven material, such as PP nonwoven. In some embodiments, the backing layer 310 may be operable to attach to the attaching element 110 of the face mask 100. In some embodiments, the backing layer 310 may also comprise an attaching element, such as push buttons, slide attachments, hook-and-loop (e.g., Velcro), and/or an adhesive.

Some embodiments of the disclosure may comprise a method of manufacturing a face mask comprising an absorbing element. In some embodiments, an absorbent core may be provided, wherein the absorbent core may comprise an annular shape. The absorbent core may be attached to one or more absorbing sheet layers. Then, the absorbing core and one or more absorbing sheet layers may be enclosed between a facing layer and a backing layer. The layers may form an absorbing element. The layers of the absorbing element may be attached to one another via ultrasonic welding, thermal welding, or another similar attachment technique. In some embodiments, an attachment element may be attached to the inner surface of a face mask. Then, the absorbing element may be attached to the attachment element. In some embodiments, the attachment element may comprise a removable attachment with the absorbing element, wherein the absorbing element may be removed and replaced during the life of the face mask.

In some embodiments, the method may also comprise the assembly of the face mask, comprising form the body of the face mask, and attached straps to the face mask. In some embodiments, a nose bridge may be attached to the interior and/or exterior of the face mask.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An absorbing element for a face mask, the absorbing element comprising:

a facing layer operable to allow moisture to penetrate into the absorbing element;

a plurality of absorbing sheet layers comprising a first absorbing sheet layer and a second absorbing sheet layer operable to disperse the moisture within the absorbing element;

an absorbent core operable to absorb the moisture and positioned between the first absorbing sheet layer and the second absorbing sheet layer, wherein the first absorbing sheet layer and the second absorbing sheet layer comprise a same material;

a back layer operable to contain the moisture within the absorbing element; and a plurality of flaps configured to extend at sides of the face mask, wherein the absorbing element is removably attached to an inner surface of the face mask via an attachment element, and wherein the absorbing element is adapted to be removed and replaced by a second absorbing element.

2. The absorbing element of claim 1, wherein the absorbing element is operable to absorb at least 20 grams of the moisture.

3. The absorbing element of claim 2, wherein the plurality of absorbing sheet layers and the absorbent core of the absorbing element comprises a width of between 0.2 centimeters and 2 centimeters.

4. The absorbing element of claim 1, wherein the plurality of absorbing sheet layers comprises a combination of polyester and pulp material.

5. The absorbing element of claim 4, wherein the plurality of absorbing sheet layers comprises 45% polyester and 55% pulp material.

6. The absorbing element of claim 1, wherein the absorbent core comprises one or a combination of the following: super absorbent fibers (SAF), super absorbent polymers (SAP), wood pulp, and nonwoven materials.

7. The absorbing element of claim 1, wherein the plurality of absorbing sheet layers is hydrophilic.

8. The absorbing element of claim 1, wherein the plurality of absorbing sheet layers is attached to the absorbent core, wherein the absorbent core and the plurality of absorbing sheet layers are enclosed between the facing layer and the back layer.

9. The absorbing element of claim 1, wherein the absorbing element is operable to seal the face mask against user's face, and wherein the absorbing element is operable to absorb the moisture.

10. The absorbing element of claim 1, wherein the absorbing element is located around a perimeter of the face mask.

11. The absorbing element of claim 1, wherein the facing layer, the plurality of absorbing sheet layers, the absorbent core, and the back layer of the absorbing element are attached to one another via ultrasonic welding or thermal welding.

12. The absorbing element of claim 1, wherein the facing layer comprises a moisture penetrable hydrophobic material that allows the moisture to penetrate into the absorbing element.

13. The absorbing element of claim 1, wherein the facing layer comprises polypropylene (PP) nonwoven material, and wherein the absorbing element is of annular shape.

14. The absorbing element of claim 1, wherein the attachment element comprises one or more of a double-adhesive tape, a press button, a slide fastener, and/or a hook-and-loop fastener to removably attach the absorbing element to an inner surface of a body of the face mask.

15. The absorbing element of claim 1, wherein the plurality of flaps configured to extend at sides of the face mask each include the plurality of absorbing sheet layers and the absorbent core.

* * * * *